United States Patent [19]
Kashima et al.

[11] Patent Number: 5,093,765
[45] Date of Patent: Mar. 3, 1992

[54] BACK LIGHTING DEVICE FOR A PANEL

[75] Inventors: Keiji Kashima; Naoki Yoshida, both of Kanagawa; Osamu Shoji, Tokyo; Eiichi Yanagi; Takumi Fukunishi, both of Kanagawa, all of Japan

[73] Assignee: Tosoh Corporation, Yamaguchi, Japan

[21] Appl. No.: 655,520

[22] Filed: Feb. 14, 1991

[30] Foreign Application Priority Data

Feb. 16, 1990 [JP] Japan ................................. 2-33813
Jul. 2, 1990 [JP] Japan ................................. 2-172809

[51] Int. Cl.$^5$ .............................................. F21V 7/04
[52] U.S. Cl. .................................................. 362/31
[58] Field of Search ................................. 362/31, 26

[56] References Cited

U.S. PATENT DOCUMENTS

| | | | |
|---|---|---|---|
| 2,347,665 | 5/1944 | Christensen et al. | 362/31 |
| 4,729,068 | 3/1988 | Ohe | 362/31 |
| 4,985,809 | 1/1991 | Matsui et al. | 362/31 |

Primary Examiner—Carroll B. Dority
Attorney, Agent, or Firm—Sughrue, Mion, Zinn, Macpeak & Seas

[57] ABSTRACT

An improved backlighting device for liquid-crystal display panels comprising a linear light source the length of which is equal to or less than the length of an end portion of a light conducting plate at which light is admitted from the linear light source placed adjacent to it, the linear light source being enclosed with a light diffusing reflector that has a slit formed in the surface through which incident light is admitted into the light conducting plate and which is provided in such a way as to form a clearance from the surface of the linear light source, one major surface of the light conducting plate being partially covered with a light diffusing material under specified conditions that has a higher refractive index than the material of which the light conducting plate is made, the major surface being further covered with a specular or light diffusing/reflecting plate, with a plurality of light diffusing plates being provided on the other major (light emerging) surface of the light conducting plate.

13 Claims, 8 Drawing Sheets

BACK LIGHTING DEVICE FOR A PANEL

BACKGROUND OF THE INVENTION

The present invention relates to a back lighting device for liquid-crystal panels that illuminates transmissive or semi-transmissive panels from the rear side.

Figure 1:
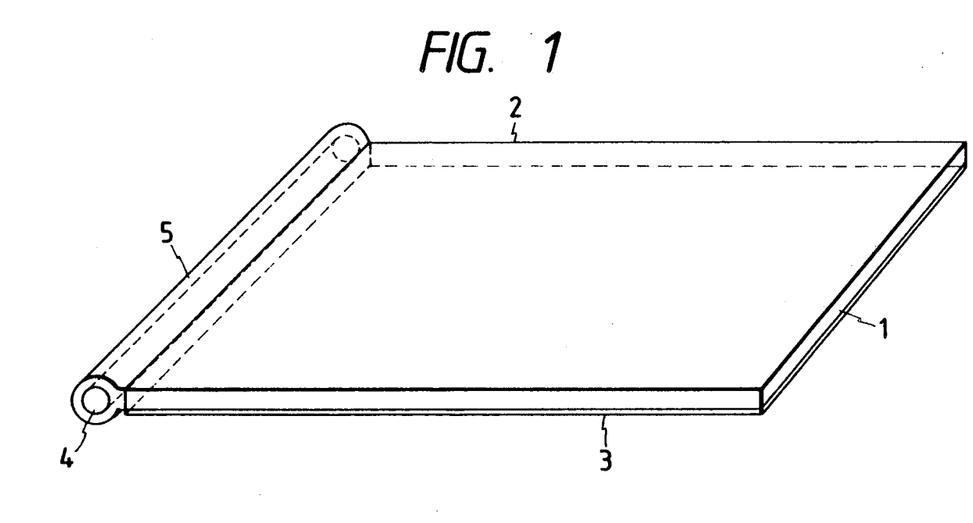
FIG. 1 is a perspective view of a back lighting device according to an embodiment of the present invention.

Thin liquid-crystal displays provided with a backlighting mechanism that allows easy viewing of information on the screen are used with recent versions of lap-top or book type word processors and computers. The backlighting mechanism in common use adopts an "edge lighting" method in which a linear light source such as a fluorescent tube is provided at one end portion of a transmissive light conducting plate as shown in FIG. 1.

In order to insure uniform light emission from a plane in the "edge lighting" method, the effective emission length of a fluorescent tube that excludes non-emitting portions such as the base and electrodes may be made greater than the length of an end face that corresponds to the display portion of the light conducting plate. However, this idea involves two major problems; first, the overall size of the device is increased compared to the liquid-crystal display face; secondly, the amount of incident light that cannot be effectively admitted into the light conducting plate increases to reduce the efficiency of power to luminance conversion.

In another approach, a certain method of converging light is applied to the light conducting plate so as to enable the use of a fluorescent tube the length of which is equal to or smaller than the length of an end portion of the light conducting plate. Even if this is possible, the portions of the fluorescent tube near the electrodes have a tendency to become dark as it is turned on and off many times. Thus, in the initial period of use, the back-lighting device may produce uniform light emission from a plane but, as a result of prolonged use, the luminance of the light conducting plate in areas where light is guided from the neighborhood of the electrodes will decrease, causing unevenness in the luminance distribution across the surface of the plate.

When back lighting devices are driven with a battery as is often the case today, a further improvement in the efficiency of power to luminance conversion is desired. To meet this need, the end face of the light conducting plate which is the farthest from the linear light source is covered with a light diffusing plate so that no part of the incident light will emerge from that end face by travelling through the plate in the same way as light is guided through optical fibers. This method, however, has had the problem that the luminance of the light emitting surface in the neighborhood of the end face covered with the light diffusing plate becomes so high as to provide an uneven luminance distribution across the emitting surface.

SUMMARY OF THE INVENTION

The present invention has been achieved under these circumstances and it provides an improved backlighting device for liquid-crystal display panels.

A back lighting device for a liquid-crystal panel according to a first aspect of the present invention comprises: a light conducting plate made of a light-transmissive material; a linear light source provided at the end portion of at least one side of the light conducting plate, at least the portion of the linear light source which is capable of uniform light emission being equal to or less than the length of the end portion, the linear light source being enclosed with a light diffusing reflector that has a slit through which light emitted from the linear light source is admitted into one side of the light conducting plate and that is provided in such a way a clearance is left between the outer surface of the linear light source and the opposing inner surface of the reflector; a coating of a light diffusing material that has a higher refractive index than the light-transmissive material and that is provided in a dot pattern on one major surface of the light conducting plate in such a way as to provide an area in which the coverage (Y) of the coating satisfies the functional relationship $Y = aX^n$ or $Y = a^x$ or the approximate relationship thereof (where X or x represents the distance from the linear light source; $n = 1.7 - 3.5$; and a is determined by regression of a mathematical expression determined by coverage of the starting and ending point on the light conducting plate) and in such a way that the coverage (Y') of the coating which is provided on the major surface of the light conducting plate in an increasing amount towards both ends of a line parallel to the axis of the linear light source satisfies the functional relationship $Y' = a'X'^n$ or $Y' = a'^{x'}$ or the approximate relationship thereof (where X' or x' represents the distance the coating departs from a line vertical to the center of the linear light source towards both ends thereof; $n = 1.7 - 3.5$; and ' is determined by regression of a mathematical expression determined by coverage of the starting and ending point on the light conducting plate) over the range from the area that is the nearest to the linear light source and where X' is at maximum (each end of the light conducting plate) to the area where $Y = Y'$ with Y' decreasing or increasing gradually and/or is constant with increasing X along the both ends of the light conducting plate; a specular or light diffusing/replacing plate that covers the coated surface; and at least one light diffusing plate provided on the other major (light emerging) surface of the light conducting plate.

A second aspect of the present invention uses a linear light source the length of which is equal to or less than the length of an end portion of a light conducting plate at which light is admitted from the linear light source placed adjacent to it, the linear light source being enclosed with a light diffusing reflector that has a slit formed in the surface through which incident light is admitted into the light conducting plate and which is provided in such a way as to form a clearance from the surface of the linear light source, one major surface of the light conducting plate being partially covered with a light diffusing material under specified conditions that has a higher refractive index than the material of which the light conducting plate is made, the major surface being further covered with a specular or light diffusing-/reflecting plate, with a plurality of light diffusing plates being provided on the other major (light emerging) surface of the light conducting plate.

As a result of the various studies further conducted in order to solve the aforementioned problems of the prior art, the present inventors found that a back lighting device for liquid-crystal panels of a third aspect of the present invention that would provide a uniform luminance distribution across the light emitting surface could be produced when a light conducting plate made of a light-transmissive material was partly coated with a light diffusing material having a higher refractive index than said light-transmissive material in such a way that the density of coating increased toward the side of the plate which was the farthest from the light source and when the farthest end face of the plate was subjected to a certain treatment.

On the basis of this finding, the present inventors studied various conditions for coating the light diffusing material. As a result, they found that a more uniform luminance distribution could be attained by adopting the following two means. First, a light diffusing material having a higher refractive index than the transmissive material of which the light conducting plate is formed is coated on one major surface of the plate in such a way that the coverage of said coating increases with the distance from the end portion of one side of the plate that faces a linear light source or in such a way that the neighborhood of the end portion of the plate which is the farthest from the light source has an area in which the coverage of the coating is equal to that in the other areas or an area in which the coverage of the coating is greater than that in the other areas but in which the rate of increase of said coverage is smaller than that in the other areas. Second, the end face of the plate which is the farthest from the light source is covered with a specular reflecting plate or film.

The area of the light conducting plate in which the coverage with the coating of a light diffusing material is equal to that in the other areas or the area in which the coverage of the coating is greater than that in the other area but in which the rate of increase of said coverage is smaller than that in the other areas is in the neighborhood of the end portion of the light conducting plate which is the farthest from the linear light source. When the distance from the side of the plate which faces the light source to the end face of the plate which is covered with a specular reflecting plate or film is written as L, an example of the above-defined area is one that covers no more than about 2/10 of L as measured from said end face of the plate.

DETAILED DESCRIPTION OF THE PREFERRED EMBODIMENT

The present invention is described below in greater detail with reference to the accompanying drawings.

Figure 2:
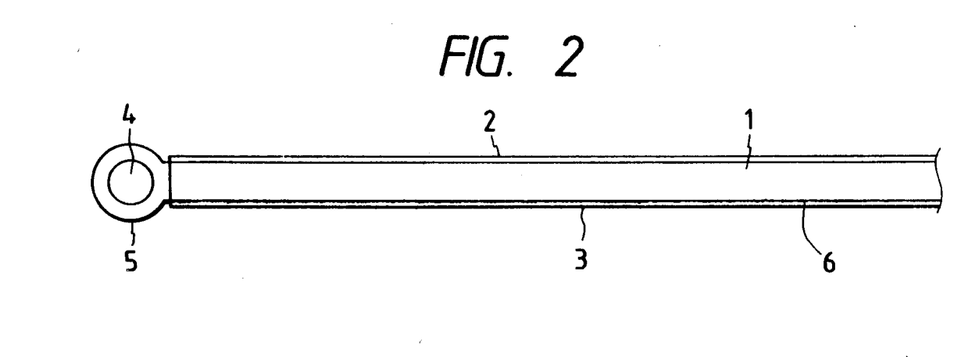
FIG. 2 is a cross section of the same back lighting device.

FIG. 1 is a perspective view illustrating an embodiment of the present invention, and FIG. 2 is a cross-sectional view of the same embodiment. Shown by 1 is a light conducting plate that may be made of any material that is capable of efficient light transmission, as exemplified by quartz, glass, light-transmissive natural or synthetic resins such as acrylic resins. Shown by 2 in FIGS. 1 and 2 is a light diffusing plate that transmits light from the light conducting plate after scattering it.

The light conducting plate is provided with a light scattering material 6 such as a paint or printing ink that contain a pigment of high diffusion reflectance that has a higher refractive index than the material of which the light conducting plate is made. Such a paint or printing ink is screen-printed or otherwise printed in dots on the surface of the light conducting plate under the conditions that are specified hereinafter. A specular or light diffusing reflector 3 is provided in such a way as to cover substantially all surface of the light conducting plate that is already covered with the light scattering material. Shown by 4 is a linear light source that is enclosed with a light diffusing reflector 5. The reflector has a slit formed in the surface through which incident light from the linear light source is admitted into an end portion of the light conducting plate and it is provided in such a way as to form a certain clearance between the outer surface of the light source and its inner surface. The linear light source 4 is provided in close proximity to at least one end face of the light conducting plate in such a way that its central axis is generally parallel to that end face. While various types of linear light source can be used such as a fluorescent tube, a tungsten incandescent tube, an optical rod and an array of LEDs, a fluorescent tube is preferred. At least the portion of the linear light source which is capable of uniform light emission has a length that is equal to or less than the length of the end portion of the light conducting plate which is in close proximity of the light source. Typically, the length of that portion of the linear light source may be about ¾ of the length of the end portion of the light conducting plate. Similarly, the overall length of the linear light source is preferably equal to or less than the length of the end portion of the light conducting plate.

The backlighting device of the first and second aspects of the present invention which has its principal part composed in the manner described above is to be used with display panels, particularly with liquid-crystal display panels. In this particular case, the backlighting device of the present invention preferably has the following constitutional features.

1) The linear light source is enclosed with a reflector that has a slit in the surface through which incident light is to be admitted into an end face of the light conducting plate. The width of the clearance between the outer surface of the linear light source and the corresponding inner surface of the reflector may be in the range of from about 0.5 to about 5 mm, preferably from 1 to 2 mm. From the performance viewpoint, the reflector should have the highest possible diffusion reflectance, preferably at least 85%. The interaction of the linear light source enclosed with the reflector and the dot pattern of the light scattering material to be discussed just below will help eliminate not only the non-emitting portions of the linear light source such as the base and the electrodes but also the adverse effects of blackening with time in the neighborhood of the electrodes.

2) The light scattering material is formed in a dot pattern on the surface of the light conducting plate. Dots may be of any shape such as a circle or rectangle. They may also be formed of crosslines. Such dots are formed in a grid pattern, with each dot being located at the point where two imaginary lines are crossed at right angles. Adjacent crossed lines are spaced by a predetermined distance which is preferably in the range of 0.5-3 mm, more preferably 0.8-2 mm, with an appropriate distance being selected in accordance with the thickness of the light conducting plate.

The surface of the light conducting plate is covered with the light scattering material in such a way that the percent coverage is preferably 1-50% of the plate surface in areas near the linear light source and 50-100% in the area that is the farthest from the light source. Preferably, the coverage with the light scattering material increases with the distance from the light source, under the conditions just described below. The term "percent coverage" as used herein means the proportion of a unit area of the light conducting plate that is occupied by the coating of the light scattering material.

The light conducting plate to be used in the present invention is preferably such that the percent coverage with the light scattering material increases in proportion to a power of the distance from the linear light source, with the power ranging from 1.7 to 3.5 or with the approximate relationship. More preferably, the light scattering material is coated on one major surface of the light conducting plate in such a way as to provide an area in which the coverage (Y) of the coating satisfies the relationship $Y=aX^n$ or $Y=a^x$ or the approximate relationship thereof, where X or x represents the distance from the linear light source to the light scattering material in a grid pattern. Areas of the light conducting plate that satisfy this condition are those other than the neighborhood of either end portion of the linear light source. In the relationship specified above, n is in the range of 1.7-3.5 and a is a proportionality constant which varies with the thickness of the light conducting plate and the size of the light emitting area. The specific value of a is determined by regression of a mathematical expression in which the percent coverage as defined above range from 1 to 50% in the neighborhood of the light source and from 50 to 100% in the area that is the farthest from the light source.

3) A further requirement for the present invention is that the coverage (Y') with the light scattering material which is coated on the light emitting surface along grid forming lines that are parallel to the axis of the linear light source should increase in such a way as to satisfy the relationship $Y'=a'X'^a$ or $Y'=a'^{x'}$ or the approximate relationship thereof, where X' or x' represents the distance the coating departs from a line vertical to the center of the length of the linear light source toward both ends thereof. In this relationship, n and a' have the same meanings as already defined. The coverage (Y') need not satisfy the above specified relationship for the entire surface of the light conducting plate; rather, the relationship only need be satisfied by the surface of the light conducting plate over a certain range of distance from the linear light source, namely, from the area that is the nearest to the light source and where X' is at maximum (each end portion of the light conducting plate) to the area where $Y=Y'$ with Y' decreasing or increasing gradually and/or is constant with increasing X along both end portions of the plate. This range will vary with the nature of the light scattering material used.

In the second aspect of the present invention, this light diffusing plate is used in more than one unit, typically in two units in superposition. Using two or more light diffusing plates, a back lighting device having satisfactory luminance can be constructed. Each of the light diffusing plates to be used in the present invention may have at least one surface rendered coarser than the other surface by a suitable roughening technique such as embossing, sand blasting or coating with a transparent resin paint containing glass beads, and the so treated plates are superposed in such a way that the coarser side forming the upper (or outer) surface.

Figure 9:
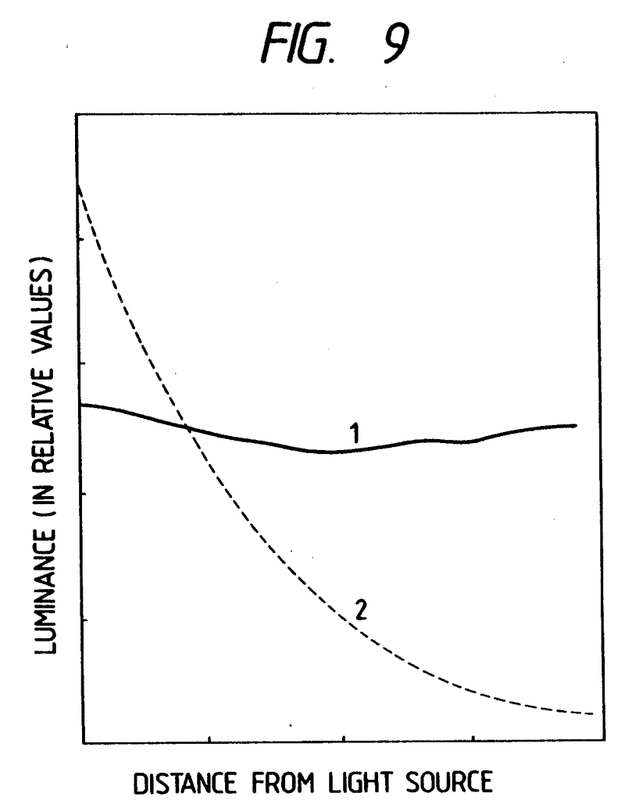
FIG. 9 is a diagram showing the state of light transmission through a light conducting plate coated with a light diffusing material in accordance with a second aspect of the present invention (as indicated by curve 1) and through a light conducting plate coated uniformly over its surface with a light-diffusing material (as indicated by curve 2)

FIG. 9 is a diagram showing the relationship between the distance from a light source and luminance for a light conducting plate coated with a light diffusing material in accordance with the second aspect the present invention and for a light conducting plate coated uniformly over its surface with a light diffusing material. Obviously, the former light conducting plate provides a generally uniform luminance distribution across the surface as indicated by curve 1.

Figure 10:
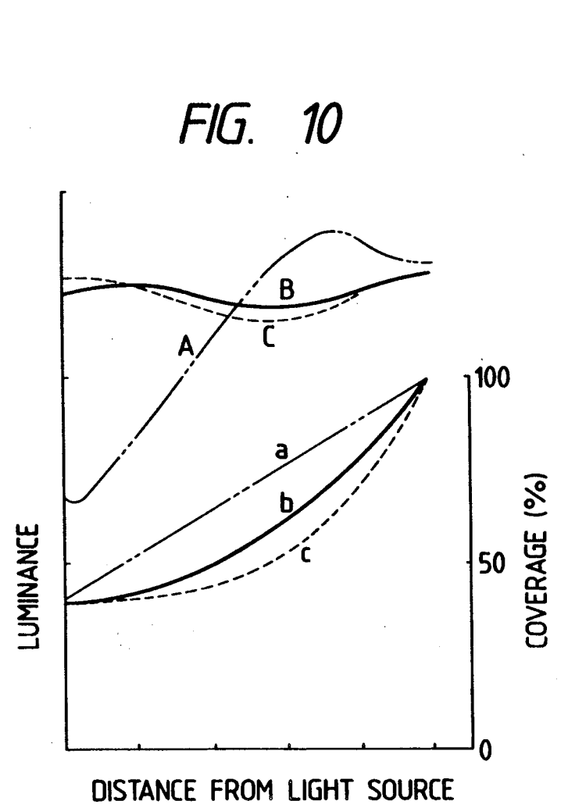
FIG. 10 is a diagram showing the profile of luminance distribution vs the distance from a light source, with the percent coverage of a light conducting plate being taken as a parameter and increasing in proportion to a power of the distance from a light source.

FIG. 10 is a diagram showing the profile of luminance distribution vs the distance (x) from alight source, with the percent coverage (y) of a light conducting plate being taken as a parameter. The percent coverage increases in proportion to a power of x. Curves a, b and c in FIG. 10 denote the changes in y for x, $x^{1.7}$ and $x^{3.5}$ and the corresponding luminance distribution profiles are denoted by curves A, B and C, respectively. As one can see FIG. 10, increasing the percent coverage in proportion to a power of x over the range of 1.7-3.5 is preferred for the purpose of obtaining a flat luminance distribution.

Figure 11:
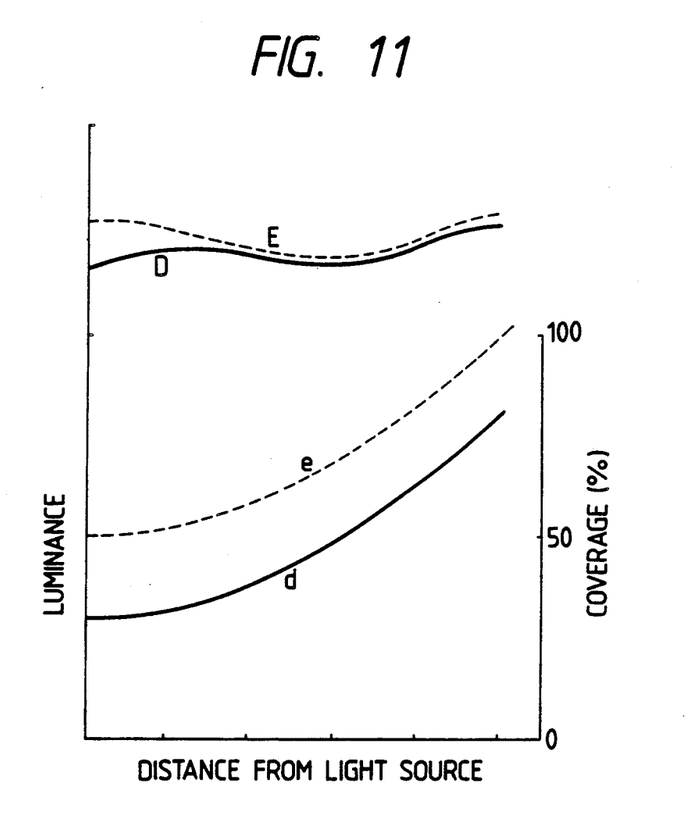
FIG. 11 is a diagram showing the profile of luminance distribution vs the distance from a light source, with the percent coverage of coating at a start and an end point being taken as a parameter.

FIG. 11 is a diagram showing the profile of luminance distribution vs the distance from a light source, with the percent coverage (y) of coating at a start and an end point being taken as a parameter. Curve d in FIG. 11 denotes coating with a coverage of 30% at the start point and 50% at the end point, and the corresponding luminance distribution profile is denoted by curve D.

Similarly, curve e denotes coating with a coverage of 50% at the start point and 100% at the end point, and the corresponding luminance distribution profile is denoted by curve E. As one can see from FIG. 11, the coverage is preferably within the range of 30-50% for the coating start point and 50-100% for the coating end point in order to obtain a flat luminance distribution.

Figure 12:
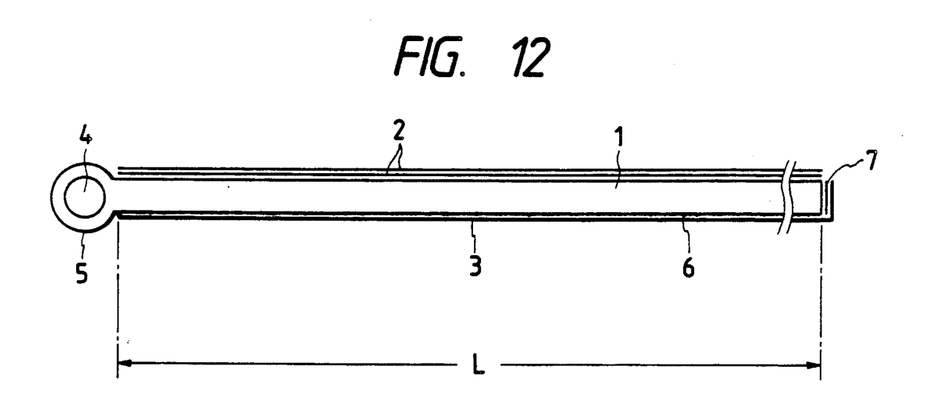
FIG. 12 is a cross section of the embodiment of the third aspect of the present invention.

In the third aspect of the present invention, as shown in FIG. 12, a specular reflecting plate 7 is further provided so as to cover the end face of the light conducting plate 1 which is farthest from the linear light source 4. The specular reflecting plate 7 may be made of any material that causes substantially specular reflection of rays of light, as exemplified by silver, aluminum, gold, copper, platinum, nickel and chromium, with silver and aluminum being preferred. The method of forming the specular reflecting plate is not limited in any particular way and it may be formed by hot stamping or evaporation. Alternatively, a separately prepared specular reflecting plate or film may be attached to the light conducting plate.

The backlighting device of the third aspect of the present invention which has its principal part composed in the manner described above is to be used with display panels, particularly with liquid-crystal display panels. In this particular case, the backlighting device of the present invention preferably has the following constitutional features.

1) The light conducting plate to be used in the third aspect of the present invention is preferably such that the percent coverage (Y%) with the light scattering material increases in proportion to a power of the distance (Xmm) from the linear light source along grid forming line, with the power ranging from 1.7 to 3.5. That is, the percent coverage (Y%) should satisfy the relationship $Y=aX^n$, where n is between 1.7 and 3.5 and a generally represent a proportionally factor and preferably is larger than 0 but not larger than 2 ($0 < a \leq 2$). It should be noted that the coverage (Y%) need not surely satisfy the above specified relationship, rather, it is possible to use the coverage which satisfies a relationship closely resembling to the specified relationship.

2) The percent coverage (Y%) increases with the distance (Xmm) from the linear light source along glid forming line, such that it is proportional to a proportionally factor a raised to a power the distance (Xmm), such as $Y=a^x$, where the factor a is larger than 1 but not larger than 2($1 < a \leq 2$). It should be noted that the coverage (Y%) need not surely satisfy the above specified relationship, rather, it is possible to use the coverage which satisfies a relationship closely resembling to the specified relationship.

3) A further requirement for the third aspect of the present invention is that the coverage (Y'%) with the light scattering material which is coated on the light emitting surface along grid forming line that are parallel to the axis of the linear light source should increase gradually with increasing the distance (X'mm) which represents the distance the coating departs from a line vertical to the center of the length of the liner light source towards both ends thereof.

The back lighting device of the present invention is used in practice with an optical display panel such as a liquid-crystal panel being positioned on top of the light diffusing plates.

The back lighting device of the present invention is comparatively small in size and yet produces a uniform luminance distribution at high luminance levels.

EXAMPLES AND COMPARATIVE EXAMPLES

Comparative examples and an example of the present invention are described below in order to further illustrate the invention.

Examples of the first aspect of the present invention are first described. A rectangular light conducting plate (250 mm × 150 mm) having a thickness of 3 mm (see FIG. 1) was provided. A cold cathode fluorescent tube (a normal tube of Harrison Denki K.K.) with a diameter of 5.8 mm that had the same length as that of the short side of the plate was positioned in contact with one of its shorter sides. The fluorescent tube was enclosed with a cylindrical aluminum reflector coated with a special resin paint to provide a diffuse reflectance of at least 85%. The clearance between the fluorescent tube and the reflector was 1 mm and the reflector had a slit 3 mm wide in the surface in contact with the light conducting plate in such a way that light emerging through the slit would be admitted into the plate from one shorter side.

In the embodiments of the first aspect of the present invention, a polyester sheet 100 μm thick having a light diffusing capability on both sides was used as a light diffusing plate.

Figure 3:
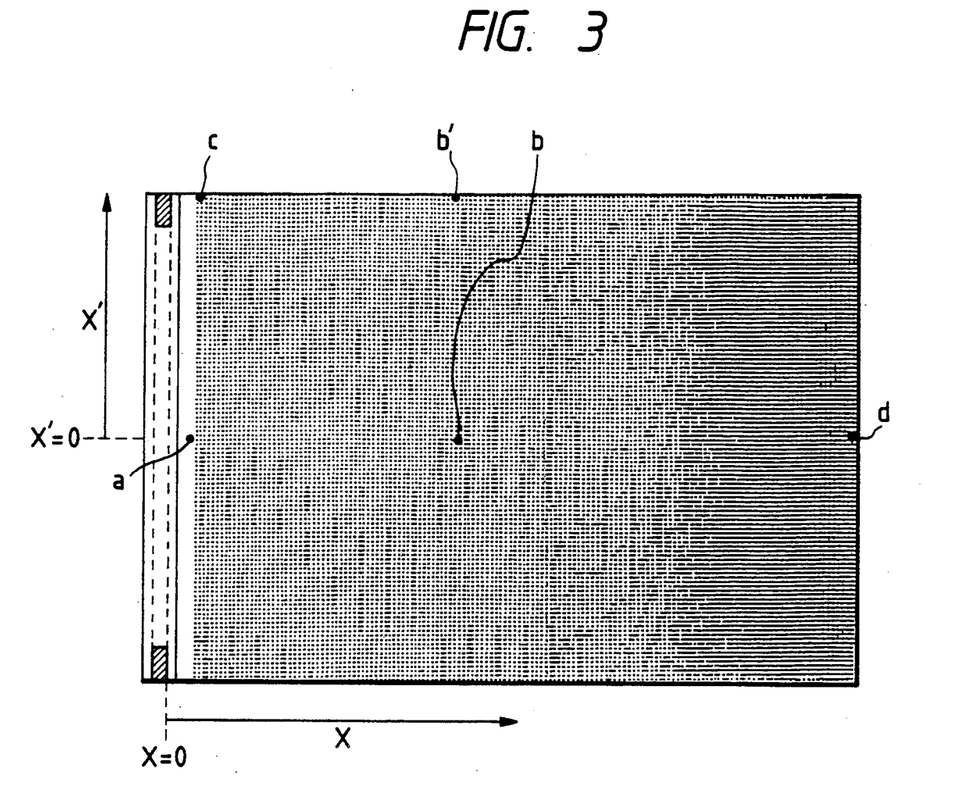
FIG. 3 is a diagram showing the distribution profile of a light scattering material coated on the light conducting plate.

A light diffusing material was applied over the surface of the light conducting plate by screen-printing a pattern of circular dots as shown in FIG. 3. A screen-printing image carrier was prepared by CAD in such a way that the coverage with the light diffusing material would be 3% at the point for a minimum value of X (near point a in FIG. 3) and 70% at the point for a maximum value of X (near point d in FIG. 3), with the coverage being proportional to $X^2$ in the intermediate area. In the direction of X' which was parallel to the linear light source, the dot pattern was designed in such a way that the coverage of the area from X=0 to point b which was substantially the center of the light conducting plate along its length would vary in proportion to the cube of X' with reference values being taken at X'=0 (points between a and b) and X'=max (points between c and b').

The coverage at point c in FIG. 3 may be properly selected from the range of 1-50% depending on the thickness of the light conducting plate, its size and the type of the cold-cathode. In the case under discussion, the coverage at point c was set at 8%.

Figure 4:
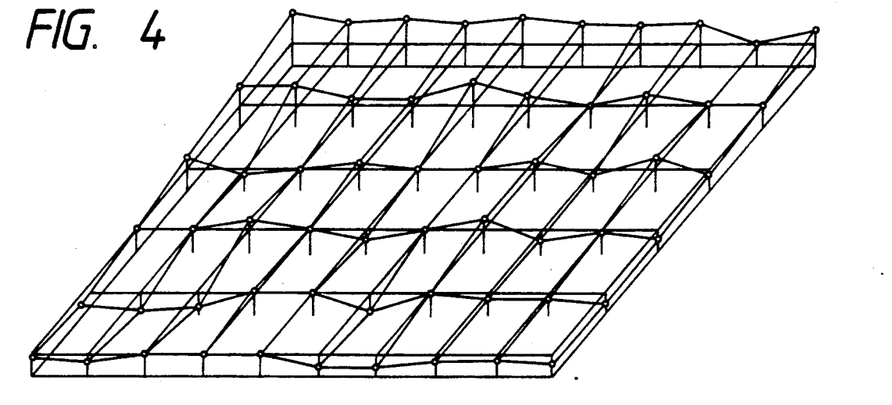
FIGS. 4-5 are diagrams showing the profiles of luminance distribution obtained in Examples 1-2 of the first aspect of the present invention, in which incident light is admitted from the right side.

The surface luminance distribution as produced when the cold-cathode tube was driven with an ac voltage (30 kHz) being applied from an inventor was measured with a luminance meter (Topcon BM-8) and graphed in FIG. 4 (Example 1), from which one can see that the back lighting device of Example 1 was a surface light source having a very flat luminance distribution profile.

Figure 5:
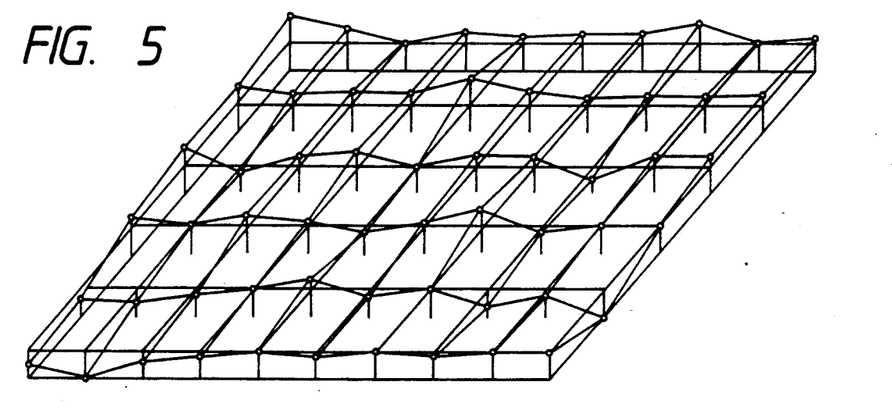

A back lighting device of the first aspect of the present invention was constructed and operated under the same conditions as described above except that the cold-cathode tube was light-shielded at both ends ca. 13 mm long by coating with a black paint. The results of measurement of luminance distribution are shown in FIG. 5 (Example 2). Obviously, there were no significant differences between the two comparative examples and the luminance distribution did not change as a result of driving under the same conditions as would cause time-dependent deterioration of the cold-cathode tube.

Figure 6:
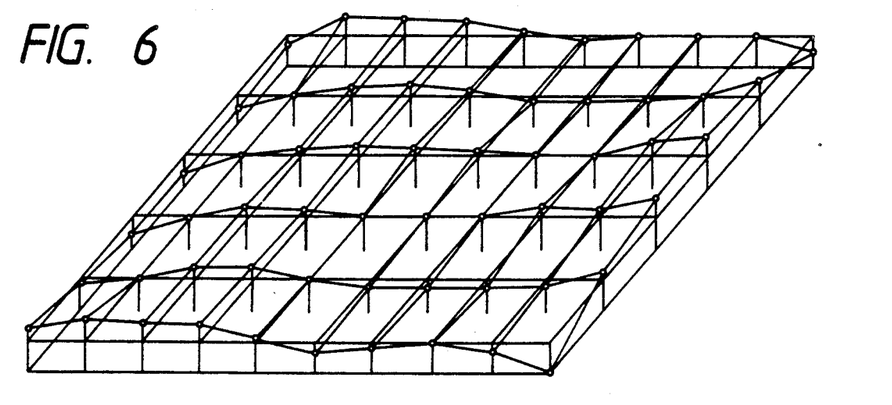
FIGS. 6-7 are diagrams showing the profiles of luminance distribution obtained in Comparative Examples 1-2, in which incident light is admitted from the right side.

Another back lighting device was constructed and operated under the same conditions as used in Example 1 except that the clearance between the cold-cathode fluorescent tube and the cylindrical aluminum reflector was reduced to 0.3 mm. The results of measurement of luminance distribution are shown in FIG. 6 (Comparative Example 1). Differences in luminance were observed in the X' direction in areas near the cold-cathode tube. Further, there was observed an overall decrease in the absolute values of luminance.

Figure 7:
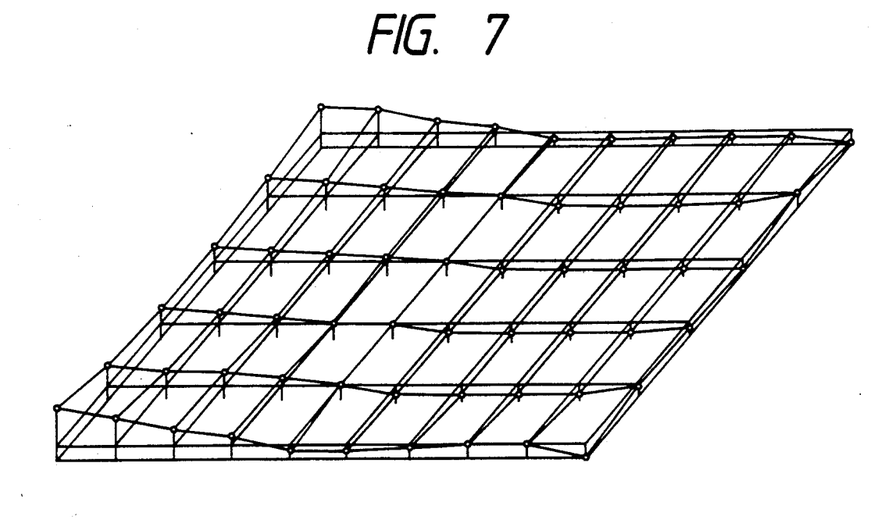

Yet another back lighting device was constructed and operated under the same conditions as used in Example 1 except that the light-diffusing material was coated in a dot pattern, with the distribution of dots being uniform in the Y' direction. The results of measurement of luminance distribution are shown in FIG. 7 (Comparative Example 2). Dark fringes were observed in areas near the cold-cathode tube.

A back lighting device of the second aspect of the present invention was constructed and operated under the same conditions as used in Example 1 except that the light-diffusing plate was replaced by two polycarbonate sheets 200 μm thick, each having a coarser surface on one side than the other, that were superposed in such a way that the coarser side would form the upper surface through which light was to be emitted (as indicated by 2 in FIG. 1). The results of measurement of luminance distribution (Example 3) were substantially the same as those obtained in Example 1 in terms of the profile of luminance distribution but the absolute values of luminance were higher.

Figure 8:
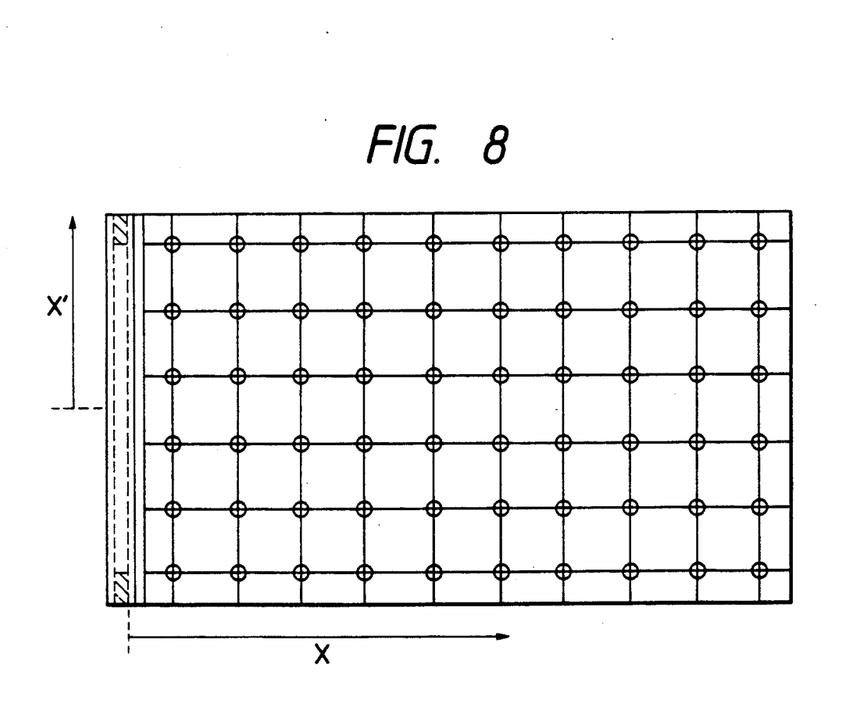
FIG. 8 is a diagram showing the points of luminance measurement.

The graphs of luminance distribution shown in FIGS. 4-7 were constructed by plotting with a computer the values of luminance that were measured at 60 points on the light conducting plate as shown in FIG. 8. The points at which two straight lines cross at right angles indicate the mean for the 60 points and the points connected by two zigzag lines indicate deviations from the mean value.

The maximum, minimum and mean values of luminance ($cd/m^2$) for each example are shown below.

|  | Max | Min | Mean |
|---|---|---|---|
| Example 1 | 182 | 175 | 178 |
| Example 2 | 181 | 174 | 178 |
| Example 3 | 205 | 197 | 201 |
| Comparative Example 1 | 178 | 135 | 161 |
| Comparative Example 2 | 240 | 143 | 171 |

A comparative example and two example of the third aspect of the present invention are described below in order to further illustrate the invention.

A comparative example is first described. A rectangular light conducting plate (225 mm × 127 mm) having a thickness of 2 mm was provided. A cold-cathode fluorescent tube (a normal tube of Harrison Denki K.K.) with a diameter of 4.8 mm that was 7 mm longer than the shorter side of the plate was positioned in contact with one of its shorter sides. The fluorescent tube was enclosed with a cylindrical aluminum reflector having a slit 2 mm wide in contact with the light conducting plate in such a way that light emerging through the slit would be admitted into the plate from one shorter side.

A light diffusing material was applied over the surface of the light conducting plate by screen-printing a pattern of circular dots. A screen-image carrier was prepared by CAD in such a way that the coverage with the light diffusing material would be 6% at the point for a minimum value of X (near point a in FIG. 13) and 80% at the point for a maximum value of X (near point d in FIG. 13), with the coverage being proportional to $X^2$ in the intermediate area.

In the direction of X' which was parallel to the linear light source, the dot pattern was designed in such a way that the coverage of the area from X=0 to point b which was substantially the center of the light conducting plate along its length would vary in proportion to the cube of X' with reference values being taken at X'=0 (points between a and b) and X'=max (points between c and b'). The coverage at point c in FIG. 13 may be properly selected from the range of 1-50% depending on the thickness of the light conducting plate, its size and the type of the cold-cathode tube. In the case under discussion, the coverage at point c was set at 10%.

Figure 13:
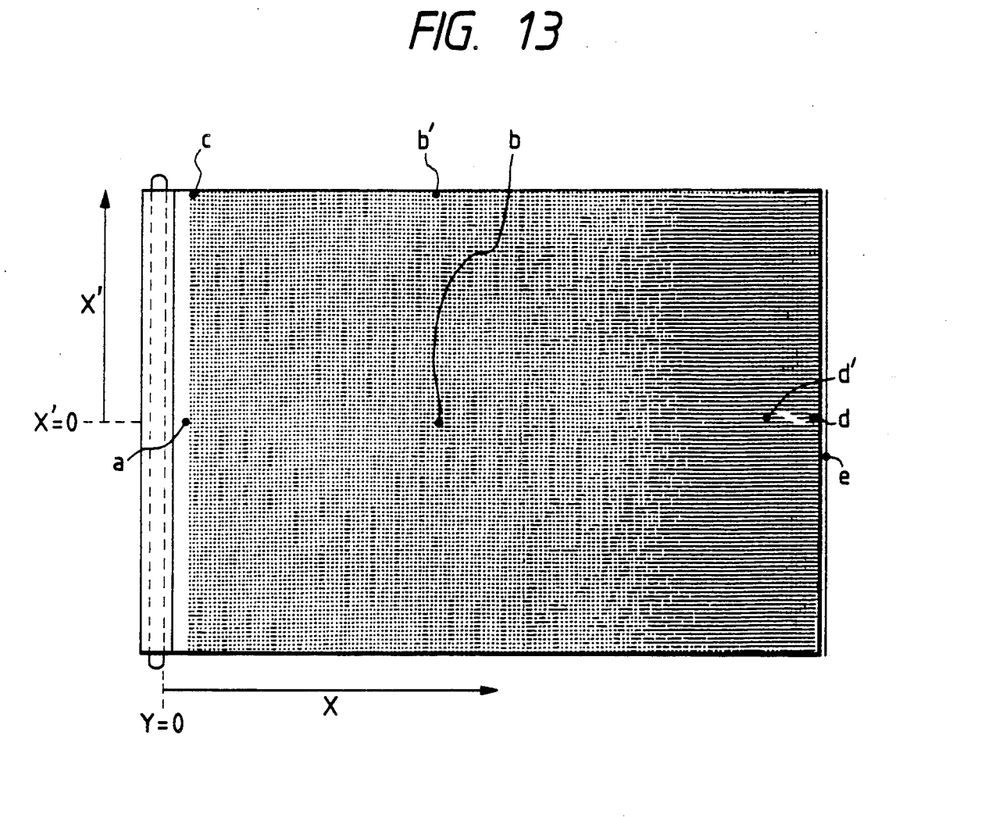
FIG. 13 is a diagram showing the distribution profile of a light scattering material coated on the light conducting plate.

The end face of the light conducting plate which was the farthest from the cold-cathode tube was covered with a light diffusing/reflecting film (MTN-W200 of Tsujimoto Denki Seisakusho K.K.) a indicated by e in FIG. 13.

Figure 14:
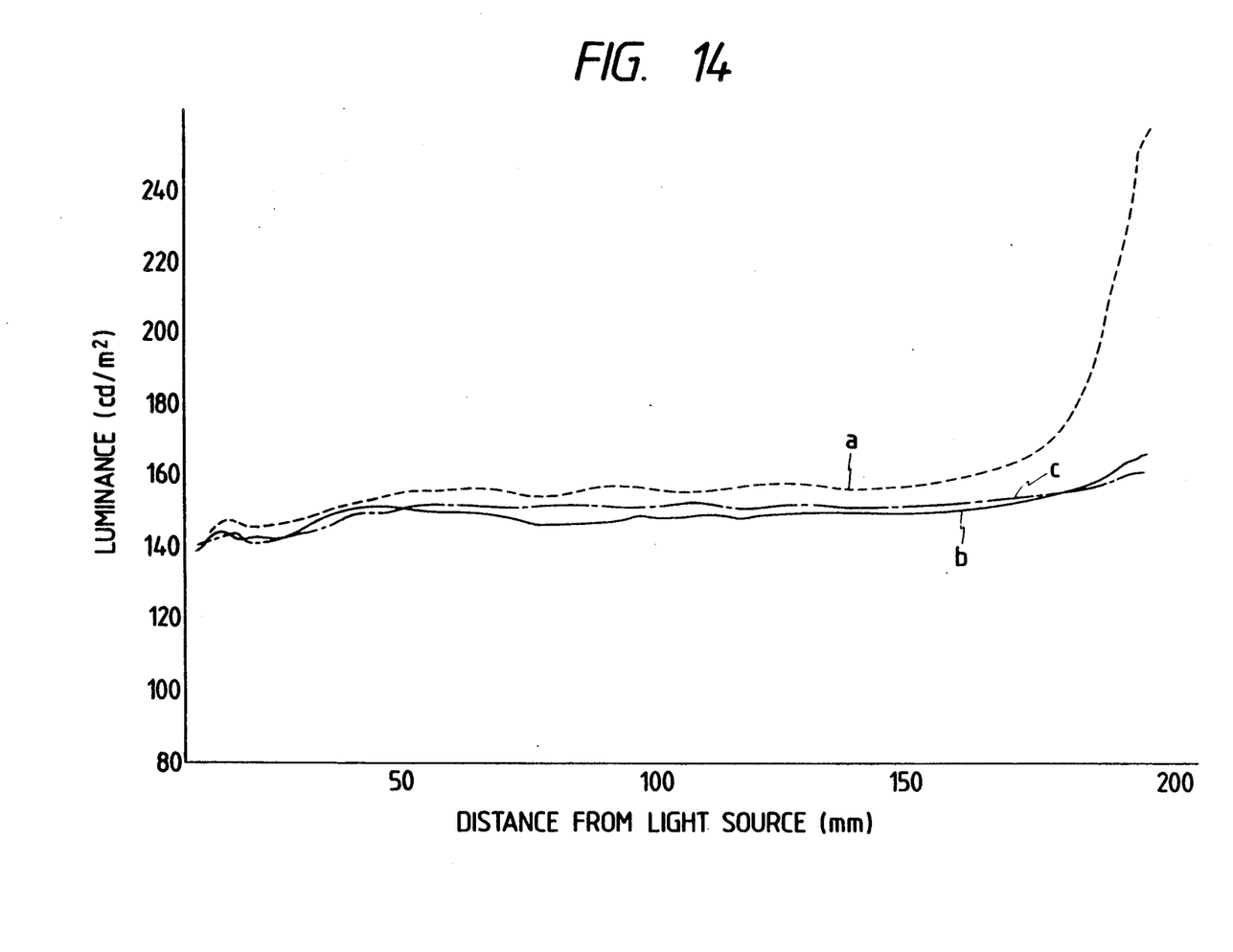
FIG. 14 is a diagram showing the profile of luminance distribution vs the distance from a light source.

The surface luminance as produced when the cold-cathode tube was driven with an ac voltage (30 kHz) being applied from an invertor was measured with a luminance meter (Topcon BM-8) and the results are shown in FIG. 14 by curve a (comparative example 3), from which one can see that the back lighting device of the comparative example produced an uneven luminance distribution at the farthest end portion of the light conducting plate.

A light backing device of a third aspect of the present invention was constructed in the same way as in the comparative example except that the reflecting plate (indicated by e in FIG. 13) was replaced by a specular reflecting film (a silver-coated high-reflectance film of Nakai Kabushiki Kaisha) and the results of luminance measurement are shown in FIG. 14 by curve b (Example 4).

Another light backing device of the third aspect of the present invention was constructed in the same way as in Example 1 except that the coverage of the light conducting plate with the light diffusing material was 80% in an area in the neighborhood of the end face of the plate where the specular reflecting film was provided and the width of which area was approximately 1/10 of the length of the plate (as indicated by point d' in FIG. 13). The results of luminance measurement are shown in FIG. 14 by curve c (Example 5).

The luminance distribution graph in FIG. 4 plots the luminance measured at various points on the light conducting plate in the x-direction shown in FIG. 5. The maximum and minimum values of luminance for each sample are shown below.

|  | Max. | Min. |
|---|---|---|
| Comparative Example 3 | 252 | 140 |
| Example 4 | 162 | 140 |
| Example 5 | 160 | 140 |

What is claimed is:

1. A back lighting device for a liquid-crystal panel comprising:
a light conducting plate made of a light-transmissive material;
a linear light source provided at an end portion of at least one side of said light conducting plate, at least a portion of said inner light source which is capable of uniform light emission being equal to or less than a length of said end portion, said linear light source being enclosed with a light diffusing reflector having a slit through which light emitted from said linear light source is admitted into one side of the light conducting plate and providing a clearance between an outer surface of the linear light source and an opposing surface of said reflector;

a coating of a light diffusing material having a refractive index greater than said light-transmissive material, said coating being provided in a dot pattern on one major surface of said light conducting plate such that an area of coverage (Y) of said coating satisfies the functional relationship $Y=aX^n$ or $Y=a^x$ or the approximate relationship thereof (where X or x represents the distance from the linear light source; $n=1.7$–$3.5$; and a is a constant determined by regression of a mathematical expression) and such that an area of coverage (Y') of said coating which is provided on said major surface of the light conducting plate in an increasing amount towards both ends of a line parallel to the axis of said linear light source satisfies the functional relationship $Y'=a'X'^n$ or $Y'=a'^{x'}$ or the approximate relationship thereof (where X' or x' represents the distance the coating departs from a line vertical to the center of the linear light source towards both ends thereof; $n=1.7$–$3.5$; and a' is a constant determined by regression of a mathematical expression) over the range from the area that is nearest to the linear light source and where X' is at maximum (each end of the light conducting plate) to the area where $Y=Y'$ with Y' decreasing or increasing gradually, and is constant with increasing X along said both ends of the light conducting plate;

a specular or light diffusing/replacing plate for covering said coated surface; and at least one light scattering plate provided on the other major and light emerging surface of said light conducting plate.

2. A back lighting device for a liquid-crystal panel according to claim 1 further comprising:

a specular reflecting member for covering an end face of said light conducting plate which is farthest from said linear light source.

3. A back lighting device for a liquid-crystal panel comprising:

a light conducting plate made of a light-transmissive material;

a linear light source provided in close proximity to an end portion of at least one side of said light conducting plate;

a coating of a light diffusing material having a refractive index greater than said light-transmissive material and is provided on one surface of said light conducting plate such that the coverage of said coating increases with the distance from the linear light source;

a specular reflecting plate or a light diffusing/reflecting plate for covering said one surface; and a plurality of light scattering plates provided on the other and surface of said light conducting plate.

4. A back lighting device for a liquid-crystal panel according to claim 3 further comprising:

a specular reflecting member for covering an end face of said light conducting plate which is farthest from said linear light source.

5. A back lighting device for a liquid-crystal panel according to claim 3, in which the coverage of the light conducting plate with said light diffusing material increases in proportion to a power of the distance from the linear light source, said power being in the range of 1.7–3.5 or with the approximate relationship thereof.

6. A back lighting device for a liquid-crystal panel according to claim 3, in which at least a portion of said linear light source which is capable of uniform light emission is equal to or less than the length of said end portion, said linear light source being enclosed within a light diffusing reflector having a slit through which light emitted from said linear light source is admitted into one side of the light conducting plate and providing a clearance between an outer surface of the linear light source and an opposing inner surface of said reflector.

7. A back lighting device for a liquid-crystal panel according to claim 6, in which said coating of a light diffusing material is provided in a dot pattern on said one surface of said light conducting plate such that an area of coverage (Y) of said coating satisfies the functional relationship $Y=aX^n$ or $Y=a^x$ or the approximate relationship thereof (where X or x represents the distance from the linear light source; $n=1.7$–$3.5$; and a is a constant determined by regression of a mathematical expression) and such that an area of coverage (Y') of said coating which is provided on said surface of the light conducting plate in an increasing amount toward both ends of a line parallel to the axis of said linear light source satisfying the functional relationship $Y'=a'X'^n$ or $Y'=a'^{x'}$ or the approximate relationship thereof (where X' or x' represents the distance the coating departs from a line vertical to the center of the linear light source towards both ends thereof; $n=1.7$–$3.5$; and a' is a constant determined by regression of a mathematical expression) over a range of an area that is nearest to the linear light source and where X' is at a maximum (each end of the light conducting plate) to the area where $Y=Y'$ with Y' decreasing or increasing gradually and is constant with increasing X along said both ends of the light conductive plate.

8. A back lighting device for a liquid-crystal panel comprising:

a light conducting plate made of a light-transmissive material;

a linear light source provided in close proximity to the end portion of one side of said light conducting plate;

a first coating of alight diffusing material having a refractive index greater than said light-transmissive material and providing on one major surface of said light conducting plate such that a coverage of said first coating increases with the distance from an end portion of said one side of said light conducting plate which faces said linear light source; and a specular reflecting member for covering an end face of said light conducting plate which is farthest from said linear light source.

9. A back lighting device for a liquid-crystal panel according to claim 8 further comprising:

a second coating of a light diffusing material having a refractive index greater than said light-transmissive material and providing on one major surface of said light conducting plate such that the area near the end portion of said light conducting plate which is farthest from said linear light source has an area in which the coverage of said second coating is equal to that in the other area or an area in which the coverage of said coating is greater than that in the other areas in which the rate of increase of said coverage is smaller than that in the other area.

10. A back lighting device for a liquid-crystal panel according to claim 8 further comprising:

a specular or light diffusing/replacing plate for covering said coated surface; and at least one light scattering plate provided on another major and light emerging surface of said light conducting plate.

11. A back lighting device for a liquid-crystal panel according to claim 8, in which the coverage of said first coating of the light conducting plate with said light diffusing material increases in proportion to a power of the distance from the linear light source, said power being in the range of 1.7–3.5.

12. A back lighting device for a liquid-crystal panel according to claim 8, in which at least a portion of said linear light source which is capable of uniform light emission is equal to or less than the length of said end portion, said linear light source being enclosed with a light diffusing reflector having a slit through which light emitted from said linear light source is admitted into one side of the light conducting plate and providing a clearance between an outer surface of the linear light source and an opposing inner surface of said reflector.

13. A back lighting device for a liquid-crystal panel according to claim 12, in which said coating of a light diffusing material is provided in a dot pattern on said one surface of said light conducting plate providing an area of coverage (Y) of said coating which satisfies the functional relationship $Y=aX^n$ or $Y=a^x$ or the approximate relationship (where X or x represents the distance from the linear light source; $n-1.7-3.5$; and a is a constant determined by regression of a mathematical expression).

* * * * *

UNITED STATES PATENT AND TRADEMARK OFFICE
CERTIFICATE OF CORRECTION

PATENT NO.   :   5,093,765
DATED        :   March 3, 1992
INVENTOR(S)  :   KASHIMA, et al.

It is certified that error appears in the above-identified patent and that said Letters Patent is hereby corrected as shown below:

Column 2, line 36, replace "diffusing/replacing" with --diffusing/reflecting--.

Column 6, line 59, replace "50%" with --80%--.

Column 11, line 31, replace "diffusing/replacing" with --diffusing/reflecting--.

Column 13, line 1, replace "diffusing/replacing" with --diffusing/reflecting--.

In Fig. 13, change "Y=0" to --X=0--.

Signed and Sealed this

Twenty-fourth Day of August, 1993

Attest:

BRUCE LEHMAN

*Attesting Officer*           *Commissioner of Patents and Trademarks*